(12) United States Patent
Kado et al.

(10) Patent No.: US 6,517,875 B1
(45) Date of Patent: Feb. 11, 2003

(54) SOLID FERMENTATION-PROMOTING SUBSTANCE AND METHOD FOR PREPARATION THEREOF

(75) Inventors: Hisao Kado, Yaizu (JP); Syuichi Ishii, Yaizu (JP); Kiyoshi Takoi, Yaizu (JP); Taiju Masuda, Yaizu (JP); Yutaka Mitani, Yaizu (JP)

(73) Assignee: Sapporo Breweries Limited, Tokyo (JP)

( * ) Notice: Subject to any disclaimer, the term of this patent is extended or adjusted under 35 U.S.C. 154(b) by 0 days.

(21) Appl. No.: 09/352,871

(22) Filed: Jul. 13, 1999

(30) Foreign Application Priority Data

Jul. 13, 1998 (JP) .................................... 10-212018

(51) Int. Cl.⁷ .................................................. C12F 3/06
(52) U.S. Cl. ............................ 426/29; 426/60; 426/624
(58) Field of Search .............................. 426/11, 29, 60, 426/592, 624

(56) References Cited

U.S. PATENT DOCUMENTS

| | | | |
|---|---|---|---|
| 4,311,721 A | * | 1/1982 | Yoshizawa et al. ......... 426/623 |
| 4,806,376 A | * | 2/1989 | Saeki et al. ................. 426/537 |
| 4,828,846 A | * | 5/1989 | Rasco et al. ................. 426/18 |
| 5,250,182 A | * | 10/1993 | Bento et al. ................ 210/641 |
| 5,316,782 A | * | 5/1994 | Zimlich, III ................ 426/624 |

FOREIGN PATENT DOCUMENTS

| | | |
|---|---|---|
| EP | 0 247 500 | 12/1987 |
| JP | 56068387 | * 6/1981 |
| JP | 9-94085 | 4/1997 |

OTHER PUBLICATIONS

Chemical Abstracts, vol. 127, No. 2, Jul. 14, 1997, AN 356109, JP 09 094085, Apr. 8, 1997.
Chemical Abstracts, vol. 126, No. 3, May 5, 1997, AN 71913, K. Wackerbauer, et al., "Modern Management Of Pitching Yeast. Promotion Of Vitality And Fermentation Acitivity Of Yeast."
Chemical Abstracts, vol. 83, No. 1, Jul. 1975, AN 407073, O.M. Protsenko, et al., "Producing Beer Mashes From Malt With Low Saccharification Capacity."

* cited by examiner

Primary Examiner—Curtis E. Sherrer
(74) Attorney, Agent, or Firm—Oblon, Spivak, McClelland, Maier & Neustadt, P.C.

(57) ABSTRACT

A method for preparing a solid fermentation-promoting substance, the method including the steps of:
  subjecting a residue obtainable from the process of production of a fermented liquor to acid treatment and separating supernatant from the acid treatment to obtain a liquid fermentation-promoting substance; and
  subjecting the resulting liquid fermentation-promoting substance to neutralization treatment to obtain the solid fermentation-promoting substance.

10 Claims, 2 Drawing Sheets

SOLID FERMENTATION-PROMOTING SUBSTANCE AND METHOD FOR PREPARATION THEREOF

BACKGROUND OF THE INVENTION

1. Field of the Invention

This invention relates to a fermentation-promoting substance capable of activating yeast for use in the production of fermented products, accelerating the rate of fermentation, and shortening the period of fermentation. More specifically, it relates to a fermentation-promoting substance derived from a residue such as spent grains and trub, that contains the grain shells of cereals in use obtained during the production of fermented liquor, like beer, which employ the cereals, as well as to a method for preparation of the fermentation-promoting substance, a method for the production of a fermented product using the same, and a method for restoring the activity of a yeast using the same.

2. Related Background Art

For example, in the publication of Japanese Patent Unexamined Appln. Hei 9-94085 by the present applicant, there is disclosed that spent grains (beer dregs) are added to the fermentation steps of beer production or the like so that the fermentation can be promoted.

The same publication also discloses that the supernatant (or extract) obtained by treating spent grains with lactic acid is used in place of the spent grains themselves. This is because there are a lot of unwanted materials in spent grains that do not contribute to the promotion of fermentation and a large quantity of spent grains is needed to be put in when the spent grains are to be added directly.

However, when this extract is used, it is possible that the fermentation-promoting ingredients are immidiately taken up by a yeast and thus the yeast will be activated at once to cause the beer quality, such as flavor, to change. In addition, the preservation and handling of such an extract is not easy. Thus, its utilization has never been satisfactory.

SUMMARY OF THE INVENTION

This invention is intended for solving the above-stated problems and enables the time of fermentation to be shortened by activating yeast consistently in a time-dependent manner and by accelerating the rate of fermentation while adequately preventing the transient, sudden progression of the fermentation. Furthermore, it aims at providing a fermentation-promoting substance that is easy to preserve and handle, as well as a method for its preparation.

In addition, the invention aims at providing a method that allows a fermented product to be produced stably for a short period of time, as well as a method capable of restoring the activity of a yeast consistently.

In an effort to solve the above-stated problems, the present inventors repeated thorough investigations. Consequently, the following have been discovered: if a residue such as spent grains, which has been obtained from the process of the production of fermented liquor, is treated with acid to yield supernatant and the supernatant is further subjected to neutralization treatment, then a substance contributable to the promotion of fermentation can selectively be extracted in the form of insoluble salts from the residue; and at the same time, it is possible to effectively remove unwanted substances such as proteins and lipids that are not connected with but rather have an impediment effect on the promotion of fermentation. It has further been discovered that the above-stated objectives are attained by using the thus-obtained solid fermentation-promoting substance. This invention has been accomplished based on this finding.

The method for preparing a solid fermentation-promoting substance according to this invention comprises the steps of:

subjecting a residue obtainable from a process of production of a fermented liquor to acid treatment (preferably in the range of pH 3–4) and separating supernatant from the acid treatment to obtain a liquid fermentation-promoting substance; and subjecting the resulting liquid fermentation-promoting substance to neutralization treatment (preferably in the range of pH 6–8) to obtain the solid fermentation-promoting substance.

Preferably, the method for preparing a solid fermentation-promoting substance according to the invention as described above further comprises the step of removing at least part of protein and lipid contained in the residue and/or the step of drying the solid fermentation-promoting substance.

The solid fermentation-promoting substance of the invention is a product obtained by the method comprising the steps of:

subjecting a residue obtainable from a process of production of a fermented liquor to acid treatment (preferably in the range of pH 3–4) and separating supernatant from the acid treatment to obtain a liquid fermentation-promoting substance; and subjecting the resulting liquid fermentation-promoting substance to neutralization treatment (preferably in the range of pH 6–8) to obtain the solid fermentation-promoting substance.

Preferably, the solid fermentation-promoting substance of the invention is a product obtained by the method comprising, in addition to the steps as described above, the step of removing at least part of protein and lipid contained in the residue and/or the step of drying the solid fermentation-promoting substance.

The method for producing a fermented product according to the invention comprises the step of fermenting by yeast, an object to be fermented in the presence of the solid fermentation-promoting substance to obtain the fermented product.

Following the method for producing a fermented product according to the invention as described above, in the fermentation step the solid fermentation-promoting substance may be added to the object to be fermented containing a yeast, or alternatively, a yeast to which the solid fermentation-promoting substance has been added in advance may be added to the object to be fermented.

The method for restoring the activity of a yeast according to the invention comprises the step of adding to the yeast, the solid fermentation-promoting substance of the invention.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
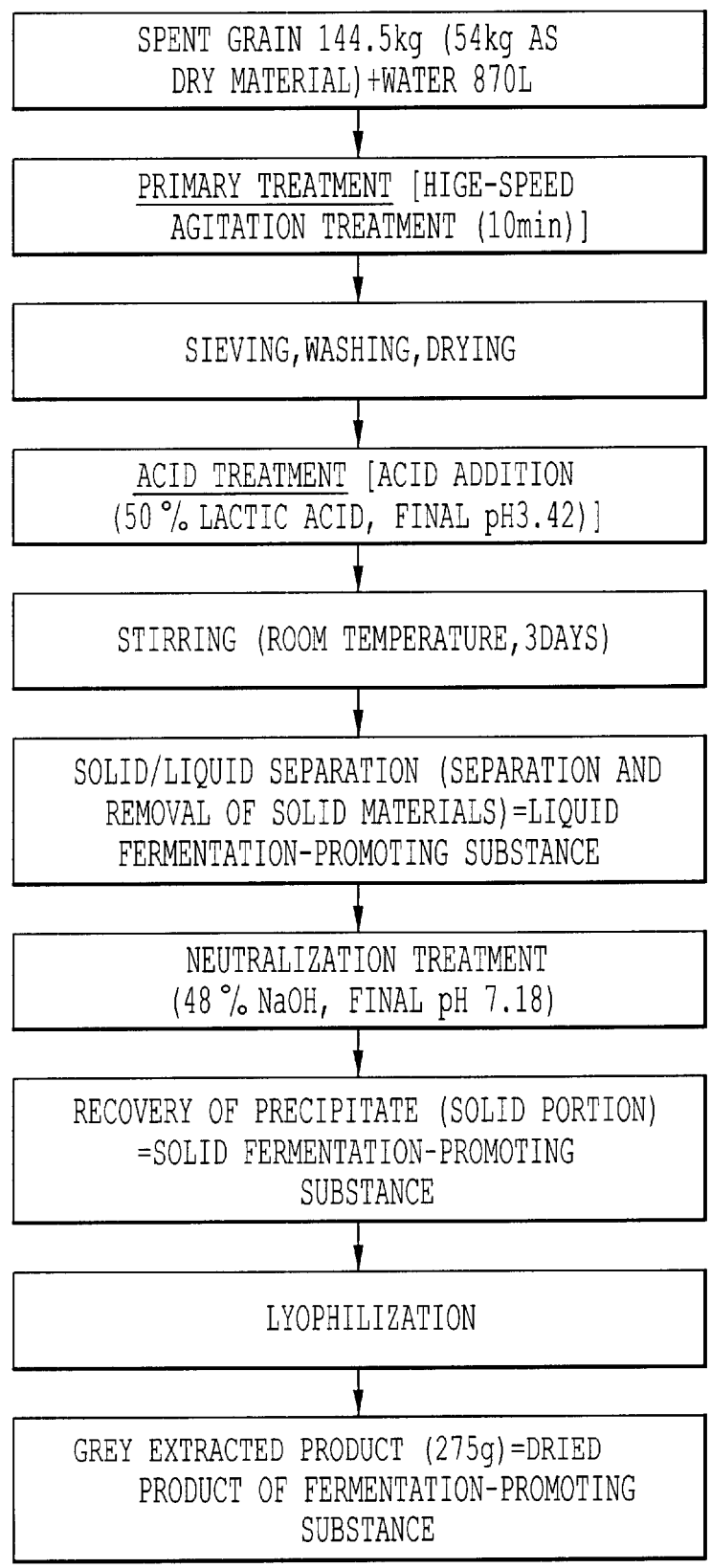
FIG. 1 is a flow chart illustrating one embodiment (Example 1) of the process for preparation of a fermentation-promoting substance according to this invention.

Hereinbelow, this invention will be explained in detail.

The method for preparing a solid fermentation-promoting substance according to this invention comprises the steps of:

subjecting a residue obtainable from a process of production of a fermented liquor to acid treatment and separating supernatant from the acid treatment to obtain a liquid fermentation-promoting substance; and subjecting the resulting liquid fermentation-promoting substance to neutralization treatment to obtain the solid fermentation-promoting substance.

Moreover, the solid fermentation-promoting substance of the invention is a product obtained by the method comprising the steps of:

subjecting a residue obtainable from a process of production of a fermented liquor to acid treatment and separating supernatant from the acid treatment to obtain a liquid fermentation-promoting substance; and subjecting the resulting liquid fermentation-promoting substance to neutralization treatment to obtain the solid fermentation-promoting substance.

For the solid fermentation-promoting substance of this invention and the method for its preparation, a residue obtainable from the process of production of fermented liquor is employed as the raw material. Such residues pertaining to the invention include the following; (I) dregs (insoluble material), viz. spent grains, that are obtained by filtering mush and separating wort (malt extract) therefrom in the preparation step of beer; (II) dregs containing the grain shells of cereals that are obtained during the production of fermented liquor, e.g. whisky, which uses the cereals; and (III) trub obtained when a wort is subjected to precipitation treatment after having been boiled.

For such a residue, that which is collected in the production processes (e.g., spent grains obtained when a wort has just been squeezed) may be used as it is. Alternatively, a dehydrated product obtained by dehydrating the residue with a dehydrator or a dried product obtained by further drying the dehydrated product with a dryer can be used.

In this invention, the residue is subjected to acid treatment (acid addition treatment). The acids that are used in the acid treatment include lactic acid, phosphoric acid, hydrochloric acid, acetic acid, etc. These acids may be used alone, or alternatively, two or more kinds may be used in combination.

In the acid treatment, an acid is added so that the pH of the residue after its addition may be not more than 4 preferably, more preferably in the range of 25 3–4. If the pH of the residue after addition is over 4, the amount of extraction of the fermentation-promoting substance diminishes, Consequently, the amount of precipitation of the effective ingredients (e.g., zinc or manganese) tends to decrease in the subsequent neutralization step, which is thus unfavorable. On the other hand, if the pH of the residue after addition is less than 3, the amount of acids such as lactic acid and phosphoric acid will increase. Consequently, the subsequent neutralization step needs a large amount of alkali and unwanted precipitates such as calcium salt increase in the subsequent neutralization step. Thus, the content of the effective ingredients tends to lower comparatively. For these reasons, the acids are preferably used to bring the pH of the residue after addition practically between 3 and 4.

For the method of acid addition, standard techniques in which acids are added dropwise while measuring the pH with a pH meter or the like can be employed, for example.

Desirably, the acid is added while stirring the residue, and after the addition of acid is complete, stirring is continued for a certain period of time to promote the extraction of the fermentation-promoting ingredients. Temperatures at which the acids are added are not particularly limited, and temperatures of from about 0° C. to about 100° C. are possible; and generally, low temperatures of from about 0° C. to around room temperature are preferable.

Next, if the stirring is discontinued, the solid component, which is an insoluble material, precipitates immediately. Then the insoluble material is removed as unwanted ingredients, and thus, only the liquid phase, which is supernatant, is separated from the unwanted ingredients. For this separation method, mentioned are, for example, as follows: a solid-liquid separation method by which the solid component is removed with a sieve and, if necessary, further using a centrifuge and only the liquid phase, supernatant, is separated.

Within the liquid phase (i.e., an extract), which is the thus-separated supernatant, inorganic salts in the residue obtainable during the production of fermented liquor remain extracted in their dissolved state through ionization by the acid treatment: the inorganic salts are the fermentation-promoting ingredients which contain zinc, manganese, magnesium, phosphoric acid, etc. and which are effective for activating yeast. Following the acid treatment, there is thus obtained a liquid fermentation-promoting substance in which the fermentation-promoting ingredients effective for activating yeast are contained as its dissolved state.

Then, the liquid fermentation-promoting substance obtained as described above is further subjected to neutralization treatment in this invention.

Specifically, the liquid fermentation-promoting substance (the extract) is neutralized by adding alkali to it, because it has turned acidic by the previous acid treatment. Through such neutralization treatment, the fermentation-promoting ingredients are precipitated and solidified as the form of insoluble salts from the liquid fermentation-promoting substance (the extract) in which such inorganic salts as described above (the fermentation-promoting ingredients) are contained as their dissolved state. Therefore, by recovering this precipitate, it is possible to obtain the solid fermentation-promoting substance of this invention containing, as the form of insoluble salts, the fermentation-promoting ingredients which contain zinc, manganese, magnesium, phosphoric acid, etc. and which are effective for activating yeast.

The neutralization treatment can be conducted, for example, by adding ordinary alkalis (or solutions thereof) such as sodium hydroxide and potassium hydroxide. These alkalis may be used alone, or alternatively, two or more kinds may be used in combination.

In the neutralization treatment, an alkali is added so that the pa after its addition may preferably be neutral at 6 or greater, more preferably in the range of 6–8, and most preferably in the range of 6–7.5. If the pH after addition is smaller than 6, the amount of precipitation of the fermentation-promoting ingredients (zinc, manganese, etc,) are likely to diminish, which is thus unfavorable. On the other hand, if the pH after addition exceeds 7.5, unwanted precipitate is unlikely tend to be generated.

For the method of alkali addition, standard techniques in which alkalis are added dropwise while measuring the pH with a pH meter or the like can be employed, for example. Temperatures at which the alkalis are added are not particularly limited, and temperatures of from about 0° C. to about 100° C. are possible; and generally, low temperatures of from about 0° C. to around room temperature are preferable. For the method of recovering the precipitate described above (the fermentation-promoting substance of this invention), mentioned is, for example, a solid-liquid separation method by which the solid component is separated from the liquid phase using a centrifuge, a sieve or the like.

Thus far, explanations have been made as to the acid treatment step and the neutralization treatment step which are both essential to this invention. In the invention, it is preferred that the residue be subjected to the treatment for removing at least part of protein and lipid contained therein (preliminary treatment) prior to the acid treatment.

This preliminary treatment is conducted to remove the unwanted ingredients, such as proteins and lipids, in advance that have an impediment effect on the flavor or the like of fermented products such as beer, which are obtained after fermentation. For such preliminary treatment, there can be mentioned mechanical treatment, chemical treatment, and the combined treatment of the foregoing.

For the mechanical treatment, any means can be employed insofar as it is the one that allows the exfoliation by a physical shock of the unwanted ingredients, such as proteins and lipids, which adhere to the grain in the residue. For example, treatment with a high-speed agitator may be mentioned as such mechanical treatment. Concretely mentioned as the method is as follows: after a physical shock is provided on the residue for a period of 1–60 min by means of a high-speed agitator, it is treated with a sieve under washing with water and the unwanted ingredients are removed by the washing. This method enables the effective removal of the unwanted proteins and lipids other than the grain shells. In addition, a similar objective can also be attained by mechanical means such as pressurized treatment and exfoliation treatment.

For the chemical treatment, mentioned are alkali treatment, treatment with organic solvent, supercritical extraction treatment using carbon dioxide gas, and the like. These techniques may be used alone, or alternatively, two or more kinds may be used in combination. As used herein, the "alkali treatment" is conducted, for example, using sodium hydroxide, potassium hydroxide, or the like; the "treatment with organic solvent" is conducted for example, using organic solvents such as alcohols (e.g., methanol), chloroform, acetone, and hexane either alone or in combination. Moreover, the treatment may be a combination of the mechanical treatment and the chemical treatment for use, namely the two kinds of treatment that are combined for use.

This preliminary treatment removes a part or the whole of the unwanted ingredients, such as proteins and lipids, in advance that have an impediment effect on the flavor or the like of fermented products, such as beer, which are obtained after fermentation. For example, when the treatment with a high-speed agitation pulverizer is conducted, the crude protein in the residue can be reduced to from about a half to about one third its content, and the lipid (crude fat) can be reduced to as little as from about a quarter to one fifth its content. On the other hand, the content of the fermentation-promoting ingredients remains almost unchanged even after the preliminary treatment. In this way, the unwanted ingredients, such as proteins and lipids, are effectively removed in advance which are inherently contained in the residue and which have an impediment effect on the quality of the fermented products such as their flavor or the like. This definitely prevents the quality of the fermented products from being changed.

In this invention, it is preferred that the solid fermentation-promoting substance obtained in the neutralization treatment step described above be further dried. The conditions for the drying step are not particularly limited; for such a drying method, any technique among drying at atmospheric pressure with heating, spray drying, lyophilization, and the like may be used. Thus, if the solid fermentation-promoting substance of this invention is made into a dried product of the fermentation-promoting substance in the dried state, its handling and preservation will become easier.

From the solid fermentation-promoting substance of this invention obtained by the foregoing method of the invention, the unwanted ingredients such as crude proteins and crude fats contained in the residue, the raw material, have been adequately removed; whereas, the inorganic salts (the fermentation-promoting ingredients) that contain manganese magnesium, phosphoric acid, zinc, etc. and that are effective for activating yeast are abundantly contained even in the state of insoluble salts in the solid fermentation-promoting substance.

Namely, not only the fermentation-promoting ingredients but also ingredients unnecessary for activating yeast (e.g., sodium and potassium) are contained as their ionized and dissolved state in a liquid fermentation-promoting substance in the prior art (i.e., the supernatant from the acid treatment). By contrast, the unwanted ingredients have been removed at the time of the neutralization treatment (alkali treatment) in the solid fermentation-promoting substance of this invention; therefore, the fermentation-promoting ingredients are contained as insoluble salts therein at a high concentration level. Consequently, as compared to the liquid fermentation-promoting substance in the prior art, the percentage content of the fermentation-promoting ingredients have been relatively enhanced in the solid fermentation-promoting substance of the present invention.

Furthermore, the fermentation-promoting ingredients are contained as its ionized and dissolved state in the liquid fermentation-promoting substance in the prior art. Thus, the entire fermentation-promoting ingredients are immediately taken up by a yeast when it is added to the yeast. The yeast will then be activated in a short time, which leads to the possibility that the quality of a fermented product changes. In contrast with this, the fermentation-promoting ingredients are contained as insoluble salts in the solid fermentation-promoting substance of this invention. Therefore, as fermentation progresses, the fermentation-promoting ingredients gradually elute and will be taken up by a yeast. Hence, the yeast is consistently activated in a time-dependent manner while the transient, sudden progression of fermentation is adequately prevented. Specifically, the pH of a wort gradually lowers from about 5.4 (at the initial stage) to about 3.5–4 in the fermentation step of beer, for example. Thus, the insoluble salts, which are the fermentation-promoting ingredients, will gradually dissolve as the pH lowers due to the progress of fermentation.

Accordingly, the solid fermentation-promoting substance of this invention may be effectively utilized in the production of alcoholic beverages such as beer. Through their utilization, it becomes possible to activate yeast consistently in a time-dependent manner, to accelerate the rate of fermentation while adequately preventing the transient, sudden progression of fermentation, and then to shorten the time of fermentation.

Additionally, although the liquid fermentation-promoting substances in the prior art are indeed extracts, comparatively large quantities of unwanted ingredients, such as a lot of water, that would not contribute to the promotion of fermentation remain in them. Thus, when the conventional liquid fermentation-promoting substances are to be used in industrial production, they require production facilities for large quantities of their addition, as well as their storage space similarly to the case where the spent grains are used. Their form is therefore not suited to the transportation in sizable quantities. As opposed to this, the fermentation-promoting substances of this invention are in solid forms. Further, they have a high percentage content of the fermentation-promoting ingredients (namely, a low percentage content of unwanted ingredients) as stated above. Thus, such production facilities are not especially required and their preservation and handling is easy.

Next, the method for producing a fermented product according to this invention will be explained.

The method for producing a fermented product according to the invention comprises the step of fermenting by yeast, an object to be fermented in the presence of the solid fermentation-promoting substance of the invention to obtain the fermented product. Following the method for producing a fermented product according to the invention, in the fermentation step described above the solid fermentation-promoting substance may be added to the object to be fermented containing a yeast; or alternatively, a yeast to which the solid fermentation-promoting substance has been added in advance may be added to the object to be fermented.

As used herein, the term "an object to be fermented" means a fermentation mixture containing a yeast and raw materials, and in addition, a fermented product; for example, a wort in the process of beer production may be mentioned.

The amount of addition of the solid fermentation-promoting substance according to this invention is not particularly limited, and is chosen depending on the fermentation conditions, the content of the effective elements in the fermentation-promoting substance, and the like. For example, where a dried product of the solid fermentation-promoting substance is added to a wort when fermented liquor, beer, is produced, the amount of its addition is desirably in the range of from 1 g to 20 g per 1000 liter of the wort, viz. the addition at the rate of 1 ppm to 20 ppm. In the case where the solid fermentation-promoting substance has been added in advance to a yeast for use in the fermentation, it is enough to use the amount corresponding to that to be added to the wort. If the amount of addition is below the lower limit described above, the fermentation period is unlikely to be shortened. On the other hand, even if it is above the upper limit, the extent of shortening of the fermentation periods is almost unaltered, for which reason it is impractical.

The solid fermentation-promoting substance is to be added in advance to a yeast for use in the fermentation; it is especially effective for a so-called yeast of the long storage (long term stored yeast). That is to say, the timing of addition is not particularly limited in the case where the solid fermentation-promoting substance has been added in advance to the yeast for use in the fermentation. The fermentation-promoting substance may be added on the day before using in fermentation, or alternatively, the yeast may be preserved for a long time after its addition. As used herein, the term "a yeast of the long storage" means a notion in contrast with the yeast (a so-called ordinary yeast) that is recovered after fermentation is complete and is continuously used as an exposed yeast (on the order of one week even if preserved temporarily); and it refers to a yeast preserved for 2 to 3 weeks or longer.

The factor that shortens the period of fermentation as thus described is previously stated. Namely, the inorganic salts (the fermentation-promoting ingredients) that are contained in the solid fermentation-promoting substance and that contain manganese, zinc, magnesium, etc. gradually elute during the production of fermented products such as beer (i.e., the fermentation step). The yeast then incorporates the fermentation-promoting ingredients, which account for the aforesaid shortening. Accordingly, fermented products are produced consistently for short periods in the method for producing fermented products according to this invention.

In the method for producing a fermented product according to the invention, steps other than the fermentation step are not particularly limited, and standard methods required to obtain the final desired fermented products are employed.

Next, the method for restoring the activity of a yeast according to this invention will be explained. The method for activating the activity of a yeast according to the invention comprises the step of adding to the yeast, the solid fermentation-promoting substance of the invention.

The amount of addition of the solid fermentation-promoting substance according to the invention is not particularly limited, and is chosen depending, among others, on the content of the effective ingredients in the fermentation-promoting substance. For example, where a dried product of the solid fermentation-promoting substance is added to the yeast for producing beer as fermented liquor, the amount of its addition is desirably such that it will be eventually, relative to the wort, in the range of from 1 g to 20 g per 1000 liter of the wort, viz. the addition at the rate of 1 ppm to 20 ppm. If the amount of addition is below the lower limit described above, it is unlikely that the restoration of the activity will be attained sufficiently. On the other hand, even if it is above the upper limit, the extent of restoration of the activity is almost unaltered, for which reason it is impractical.

Following the method for restoring the activity of a yeast according to this invention, it is possible to restore the activity of the yeast consistently. Specifically, the solid fermentation-promoting substances of the invention are added to yeasts for the production of fermented products such as beer before the use of the yeasts (i.e., prior to or during their preservation), for example. This enables the consistent restoration of the activity of the yeasts for the production of such fermented products.

EXAMPLES

Next, this invention will be concretely illustrated by way of examples; however, the invention is not to be limited to these examples.

Example 1

Following the production process scheme as shown in FIG. 1, a solid fermentation-promoting substance according to this invention was produced in the manner described below.

(1) Preliminary Treatment

First, to 144.5 kg of spent grains (dehydrated product, 54 kg as converted to dried product), which were obtained by having squeezed a wort in a preparation step, was added 870 liter of water. The mixture was subjected to high-speed agitation for 10 min using a high-speed agitator. Then it was put through a sieve, while being washed, and the unwanted ingredients (e.g., proteins and lipids) other than grain shells were removed by washing.

With respect to the preliminary treatment product obtained, an investigation was made on the following: the recovery relative to the dried spent grains (dried SG) before being subjected to the preliminary treatment; and the proportions of crude protein, crude fat, and zinc (which is one of the effective ingredients) in the preliminary treatment product. Table 1 shows the results, together with the proportions of the crude protein, the crude fat, and zinc in the dried spent grains (dried SG).

TABLE 1

| | (Composition of Preliminary Treatment Product) | | | |
| --- | --- | --- | --- | --- |
| | recovery (%) (relative to dried SG) | crude protein (w/w %) | crude fat (w/w %) | zinc (weight ppm) |
| dried SG | — | 21.7 | 10.0 | 99 |
| preliminary treatment product | 28 | 8.6 | 2.2 | 66 |

According to the results shown in Table 1, a comparison of the product from the preliminary treatment with the dried spent grains (dried SG) before being subjected to the preliminary treatment was as follows: the crude protein sharply decreased from 21.7 to 8.6 w/w %; and the crude fat also sharply decreased from 10.0 to 2.2 w/w %. This revealed that the unwanted substances were effectively removed from the product at the time of fermentation. On the other hand, the content of zinc, which was one of the effective ingredients (effective elements), did not change much by being 66 weight ppm. It was thus understood that the product contained a high percentage of the effective ingredients even after the treatment.

(2) Acid Treatment

To 100 kg of the product from the preliminary treatment (1) (11 kg as converted to dry product) was added 100 liter of water and 50% lactic acid, bringing the final pH to 3.42 (with its final concentration being 95 w/w %). After addition of the acid, the resulting mixture was stirred at room temperature for 3 days to promote the reaction. Subsequently, insoluble materials (solid) were precipitated by allowing the mixture to stand. Only the liquid portion (supernatant viz. an extract) was separated to give a liquid fermentation-promoting substance.

(3) Neutralization Treatment

After the acid treatment (2), 48% aqueous sodium hydroxide solution was added to 300 liter of the liquid fermentation-promoting substance a obtained so that the final pH would be adjusted to 7.18. After addition of the alkali, the resulting mixture was stirred at room temperature for 1 days to promote the reaction. Subsequently, insoluble materials (solid) were precipitated by allowing the mixture to stand. Only the solid portion (precipitate) was separated to give a solid fermentation-promoting substance.

(4) Drying Treatment

Further, the solid fermentation-promoting substance as obtained by the neutralization treatment (3) was lyophilized to give 275 g of a dried product in grey color of the solid fermentation-promoting substance.

A visual inspection was performed on the resulting dried product of solid fermentation-promoting substance, and an analysis of the contained components was performed at the same time. The results are shown in Table 2. The proportions of the contained components shown in Table 2 are expressed as w/w % in the dried product. Ca, Mg. $PO_4$, and Zn are the components contained in the ash content, but the percentage content of each of these is expressed as w/w % relative to the total weight of the dried product of liquid fermentation-promoting substance.

which were in the state of insoluble salts (e.g., zinc lactate and zinc phosphate)-that were insoluble in a neutral cooled wort.

Examples 2–3 and Comparative Example 1

(5) Fermentation Test I

The solid fermentation-promoting substance (dried product) as obtained by the treatment (1) through (4) was used to carry out a fermentation test in the following manner.

Specifically, a 400-liter fermentation tank was employed. This was charged with 400 liter of wort, yeast and the solid fermentation-promoting substance under the conditions described below so that the substance would be 8 g relative to that 400-liter wort. The progress of fermentation was investigated under standard temperature conditions used for beer fermentation processes.

(I) The solid fermentation-promoting substance was added to the yeast on the day before the fermentation test, and said yeast was added to the wort at the start of the test (Example 2).

(II) The solid fermentation-promoting substance, together with the yeast, was directly added to the wort at the start of the fermentation test (Example 3).

(III) No fermentation promoting substance was added, but only the yeast was added to the wort (Comparative Example 1: control).

Figure 2:
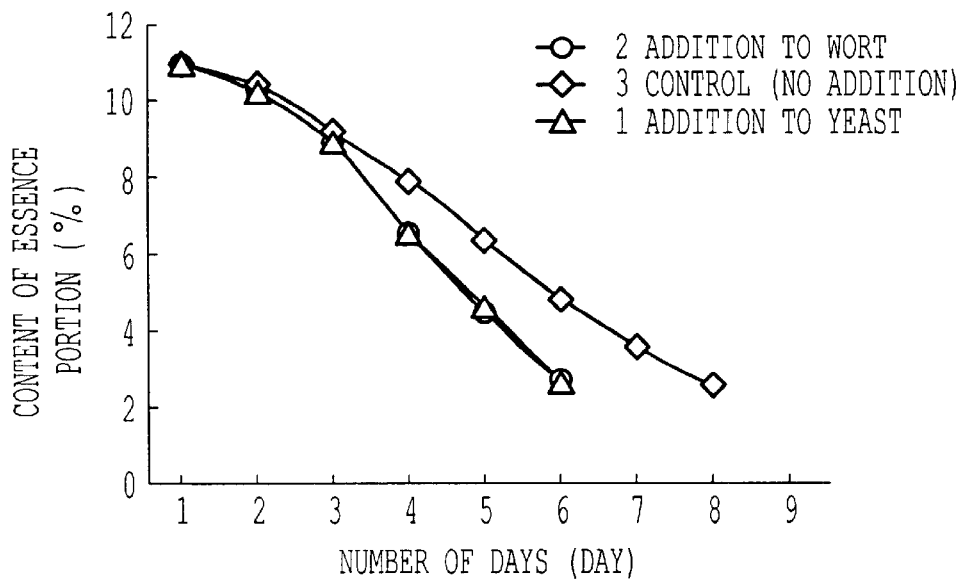
FIG. 2 is a graph showing the results (the progress of fermentation) obtained from Fermentation Test I in the Examples.

The results obtained are shown in FIG. 2. The quantity of the extract was determined using an oscillating type density meter.

As is apparent from the results shown in FIG. 2, it was found out that in either case of the (I) and (II) conditions, the fermentation completed about two days earlier than the case of (III) (without addition of the fermentation-promoting substance).

This has revealed that if the solid fermentation-promoting substance of this invention is added prior to or at the start of the fermentation test, it is possible to activate the yeast consistently in a time-dependent manner, to accelerate the rate of the fermentation while adequately preventing the transient, sudden progression of the fermentation, and then to shorten the period of the fermentation.

TABLE 2

Analytical Results of Solid Fermentation-Promoting Substance

| | | respective components (w/w %) | | | | | fermentation-promoting ingredient (w/w %) | | | |
|---|---|---|---|---|---|---|---|---|---|---|
| appearance | water | crude protein | crude fat | total sugar | lactic acid | ash content | Ca | Mg | $PO_4$ | Zn |
| grey | 5.2 | 2.4 | 0.5 | 2.6 | 2.6 | 68.6 | 16.7 | 0.3 | 28.1 | 0.65 |

As is apparent from the results shown in Table 2, it was found out that the inorganic salts (the fermentation-promoting ingredients) in the spent grains (the raw material), which contained zinc, calcium, magnesium, etc. and which were effective for activating yeast, had been extracted into the fermentation-promoting substance of this invention at high concentrations. Especially, the percentage content of zinc was 66 weight ppm in the preliminary treatment product, whereas its percentage content was 0.65 w/w %, viz. 6500 weight ppm, in the solid fermentation-promoting substance of the invention. This revealed that the percentage content of zinc in the solid fermentation-promoting substance was concentrated about 100-fold compared to that of the preliminary treatment product.

The solid fermentation-promoting substance of this invention contained the fermentation-promoting ingredients Examples 4–5 and Comparative Examples 2–3

(6) Fermentation Test II

The solid fermentation-promoting substance (dried product) as obtained by the treatment (1) through (4) was used to carry out a fermentation test in the following manner.

Specifically, after the solid fermentation-promoting substance was added to a long term stored yeast prior to its use under the conditions described below, the progress of the fermentation was investigated in a similar manner to Fermentation Test I except that the yeast was added to a wort at the start of the test.

(IV) The solid fermentation-promoting substance was added to a long term stored yeast that was to be used after having been preserved for 14 days at 0° C., on the day before its use (on the 13th day after the start of its preservation)—Example 4.

(V) The solid fermentation-promoting substance was added to a long term stored yeast that was to be used after having been preserved for 14 days at 0° C., at the start of its preservation—Example 5.

Similarly, the test was carried out on the following cases as control: (VI) a long term stored yeast that had been preserved for 14 days at 0° C. was used without addition of the fermentation-promoting substance (Comparative Example 2); and (VII) an ordinary yeast-an exposed yeast recovered after the end of fermentation-was used without addition of the fermentation-promoting substance (Comparative Example 3).

Figure 3:
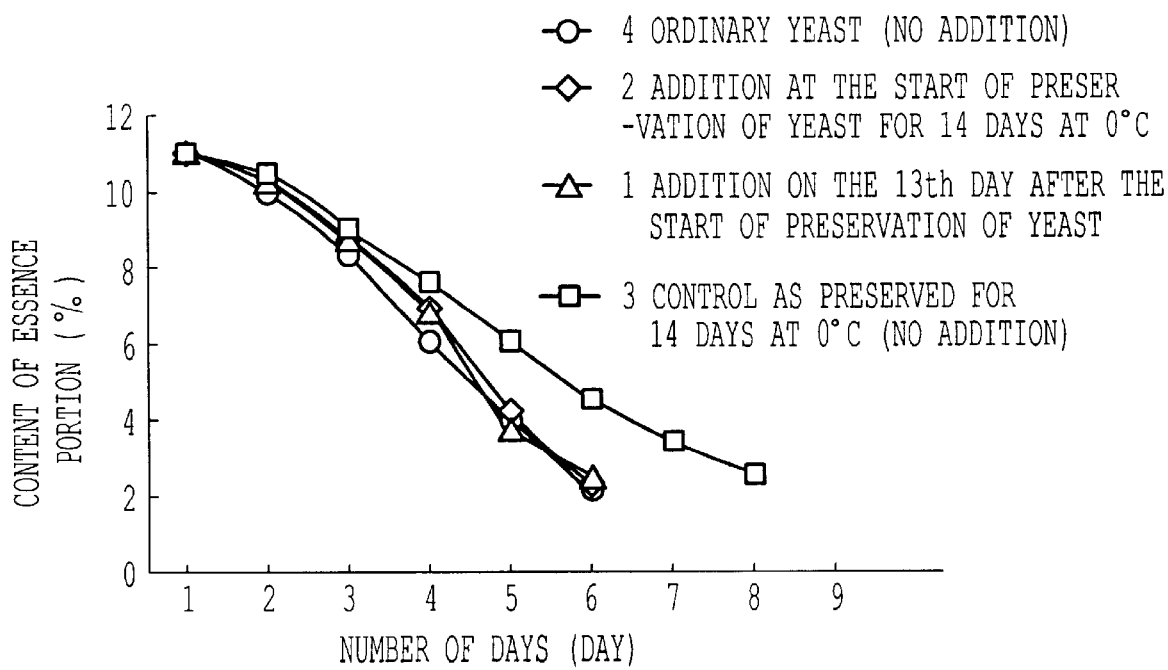
FIG. 3 is a graph showing the results (the progress of fermentation) obtained from Fermentation Test II in the Examples.

The results obtained are shown in FIG. 3. As is apparent from the results shown in FIG. 3, it was found out that in either case of (IV) and (V) where the fermentation-promoting substance had been added, the fermentation period was shortened by about two days compared to the case (VI) of no addition and thus the number of days of fermentation equal to that of the case (VII) where the ordinary yeast was used could be attained.

This has revealed that if the solid fermentation-promoting substance of this invention is added to a long term stored yeast at the start of its preservation or prior to its use, the activity of the yeast can be restored and the period of the fermentation can be shortened by accelerating the rate of the fermentation while adequately preventing the transient, sudden progression of the fermentation.

Comparative Example 4

(7) Fermentation Test III

The progress of fermentation was investigated in a similar manner to Fermentation Test I except that 8 liter of the liquid fermentation-promoting substance as obtained by the treatment (2), together with a yeast, was added to a wort at the start of the fermentation test.

The result ascertained the transient, sudden progression of fermentation at the initial stage of the fermentation step.

As has been explained above, using a solid fermentation-promoting substance of this invention, it becomes possible to activate yeast consistently in a time-dependent manner, to accelerate the rate of fermentation while adequately preventing the transient, sudden progression of fermentation, and then to shorten the time of fermentation during the production of fermented products such as beer. Furthermore, the preservation and handling of the fermentation-promoting substance according to the invention is easy, because it is in a solid form and, in addition, it contains a high concentration of a fermentation-promoting ingredients.

Also, according to the method for preparation of the invention, it becomes possible to obtain a solid fermentation-promoting substance of the invention efficiently and reliably.

Further, following the method for producing a fermented product according to the invention, it becomes possible to produce the fermented product stably for a short period of time; and by following the method for restoring the activity of a yeast according to the invention, it becomes possible to restore the activity of the yeast consistently.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for preparing a solid fermentation-promoting substance containing inorganic salts of zinc, manganese, magnesium and phosphoric acid comprising:

treating spent grain obtained by filtering mash during production of beer with acid at pH 3–4;

separating supernatant from said spent grain to obtain a liquid fermentation-promoting substance; and neutralizing said liquid fermentation-promoting substance at pH 6–8 to obtain said solid fermentation-promoting substance.

2. The method according to claim 1, further comprising the step of removing at least part of protein and lipid contained in said spent grain.

3. The method according to claim 1, further comprising the step of drying said solid fermentation-promoting substance.

4. A solid fermentation-promoting substance containing inorganic salts of zinc, manganese, magnesium and phosphoric acid obtained by the method comprising:

treating spent grain obtained by filtering mash during production of beer with acid at pH 3–4;

separating supernatant from said spent grain to obtain a liquid fermentation-promoting substance; and neutralizing said liquid fermentation-promoting substance at pH 6–8 to obtain said solid fermentation-promoting substance.

5. The substance according to claim 4, obtained by the method further comprising the step of removing at least part of protein and lipid contained in said spent grain.

6. The substance according to claim 4 obtained by the method further comprising the step of drying said solid fermentation-promoting substance.

7. A method for producing a fermented product comprising fermenting a wort by yeast in the presence of said solid fermentation-promoting substance according to claim 4 to obtain said fermented product.

8. The method according to claim 7, wherein said solid fermentation-promoting substance is added to said wort containing a yeast.

9. The method according to claim 7, wherein a yeast containing said solid fermentation-promoting substance is added to said wort.

10. A method for restoring the activity of yeast comprising adding to said yeast said solid fermentation-promoting substance according to claim 4.

* * * * *